(12) United States Patent
Tanaka

(10) Patent No.: US 7,919,726 B2
(45) Date of Patent: Apr. 5, 2011

(54) LASER IRRADIATION APPARATUS, LASER IRRADIATION METHOD, AND METHOD FOR MANUFACTURING A SEMICONDUCTOR DEVICE

(75) Inventor: Koichiro Tanaka, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 104 days.

(21) Appl. No.: 10/721,075

(22) Filed: Nov. 26, 2003

(65) Prior Publication Data

US 2004/0119955 A1 Jun. 24, 2004

(30) Foreign Application Priority Data

Nov. 29, 2002 (JP) ................................ 2002-349007

(51) Int. Cl.
*B23K 26/00* (2006.01)
(52) U.S. Cl. .......... 219/121.76; 219/121.78; 219/121.81
(58) Field of Classification Search ............. 219/121.76, 219/121.78, 121.81, 121.85, 121.65, 121.66
See application file for complete search history.

(56) References Cited

U.S. PATENT DOCUMENTS

| | | | |
|---|---|---|---|
| 5,643,801 A | 7/1997 | Ishihara et al. | |
| 5,643,826 A | 7/1997 | Ohtani et al. | |
| 5,897,799 A | 4/1999 | Yamazaki et al. | |
| 5,900,980 A | 5/1999 | Yamazaki et al. | |
| 5,923,962 A | 7/1999 | Ohtani et al. | |
| 5,953,597 A * | 9/1999 | Kusumoto et al. ............ 438/161 |
| 5,959,779 A | 9/1999 | Yamazaki et al. | |
| 6,002,523 A | 12/1999 | Tanaka | |
| 6,014,401 A * | 1/2000 | Godard et al. ................. 372/97 |
| 6,038,075 A | 3/2000 | Yamazaki et al. | |
| 6,156,997 A * | 12/2000 | Yamazaki et al. ......... 219/121.8 |
| 6,242,292 B1 * | 6/2001 | Yamazaki et al. ............ 438/166 |
| 6,528,397 B1 | 3/2003 | Taketomi et al. | |

(Continued)

FOREIGN PATENT DOCUMENTS

AU 2003220835 A1 * 9/2003

(Continued)

OTHER PUBLICATIONS

Official Action dated Jul. 26, 2005, Singapore Patent Office, for Application No. 200307418-4.

(Continued)

*Primary Examiner* — M. Alexandra Elve
(74) *Attorney, Agent, or Firm* — Eric J. Robinson; Robinson Intellectual Property Law Office, P.C.

(57) ABSTRACT

It is an object to provide a laser irradiation apparatus for enlarging an area of a beam spot and reducing a proportion of a region with low crystallinity. It is also an object to provide a laser irradiation apparatus for enhancing throughput with a CW laser beam. Furthermore, it is an object to provide a laser irradiation method and a method for manufacturing a semiconductor device with the laser irradiation apparatus. A region melted by a first pulsed laser beam having harmonic is irradiated with a second CW laser beam. Specifically, the first laser beam has a wavelength of visible light or a shorter wavelength than that of visible light (approximately not more than 830 nm, preferably, not more than 780 nm). Since the first laser beam melts a semiconductor film, an absorption coefficient of the second laser beam to the semiconductor film increases drastically and thereby being more absorbable.

48 Claims, 8 Drawing Sheets

U.S. PATENT DOCUMENTS

| | | | |
|---|---|---|---|
| 6,544,825 B1 | 4/2003 | Yamazaki | |
| 6,548,370 B1 | 4/2003 | Kasahara et al. | |
| 6,700,096 B2 * | 3/2004 | Yamazaki et al. | 219/121.73 |
| 6,806,498 B2 | 10/2004 | Taketomi et al. | |
| 7,056,810 B2 | 6/2006 | Yamazaki et al. | |
| 7,067,403 B2 | 6/2006 | Yamazaki et al. | |
| 7,125,761 B2 | 10/2006 | Tanaka | |
| 7,132,375 B2 * | 11/2006 | Yamazaki | 438/795 |
| 7,135,390 B2 | 11/2006 | Tanaka | |
| 7,304,005 B2 | 12/2007 | Yamazaki et al. | |
| 7,304,265 B2 * | 12/2007 | Otsu et al. | 219/121.62 |
| 2002/0094008 A1 | 7/2002 | Tanaka | |
| 2003/0022471 A1 | 1/2003 | Taketomi et al. | |
| 2003/0203602 A1 | 10/2003 | Tanaka | |
| 2004/0069751 A1 | 4/2004 | Yamazaki et al. | |
| 2004/0097103 A1 | 5/2004 | Imai et al. | |
| 2004/0121516 A1 | 6/2004 | Yamazaki et al. | |
| 2004/0169023 A1 | 9/2004 | Tanaka | |
| 2004/0171237 A1 | 9/2004 | Tanaka et al. | |
| 2004/0198028 A1 | 10/2004 | Tanaka et al. | |
| 2004/0253838 A1 | 12/2004 | Yamazaki et al. | |
| 2004/0259387 A1 | 12/2004 | Yamazaki et al. | |
| 2005/0252894 A1 | 11/2005 | Imai et al. | |
| 2006/0019474 A1 | 1/2006 | Inui et al. | |
| 2006/0220211 A1 | 10/2006 | Yamazaki et al. | |
| 2006/0237397 A1 | 10/2006 | Yamazaki et al. | |
| 2007/0037332 A1 | 2/2007 | Tanaka | |
| 2007/0054479 A1 | 3/2007 | Tanaka | |
| 2007/0158315 A1 | 7/2007 | Tanaka et al. | |
| 2007/0184590 A1 | 8/2007 | Tanaka et al. | |

FOREIGN PATENT DOCUMENTS

| | | | |
|---|---|---|---|
| EP | 1 049 144 | | 11/2000 |
| JP | 04-124813 | | 4/1992 |
| JP | HEI4-24813 | * | 4/1992 |
| JP | 07-183540 | | 7/1995 |
| JP | 07-187890 | | 7/1995 |
| JP | 08-148423 | | 6/1996 |
| JP | 11-307450 | | 11/1999 |
| JP | 2000-286209 | | 10/2000 |
| JP | 2002-217125 | | 8/2002 |
| JP | 2002-261015 | | 9/2002 |

OTHER PUBLICATIONS

Official Action dated Aug. 3, 2005, Singapore Patent Office, for Application No. 200307418-4.

* cited by examiner

LASER IRRADIATION APPARATUS, LASER IRRADIATION METHOD, AND METHOD FOR MANUFACTURING A SEMICONDUCTOR DEVICE

BACKGROUND OF THE INVENTION

1. Field of the Invention

The present invention relates to a laser irradiation apparatus utilized for crystallizing a semiconductor film. Moreover, the present invention relates to a laser irradiation method and a method for manufacturing a semiconductor device using the laser irradiation apparatus of the present invention.

2. Description of the Related Art

Thin film transistor employing poly-crystalline semiconductor film (poly-crystalline TFT) is superior by double digits or more to TFT employing an amorphous semiconductor film in terms of its mobility, and thereby has an advantage that a pixel portion and a peripheral driver circuit thereof in a semiconductor display device can be integrated on a same substrate. The poly-crystalline semiconductor film can be formed over an inexpensive glass substrate by employing a laser annealing method.

Laser oscillators are generally classified into two types of pulsed laser oscillators and continuous wave (CW) laser oscillators. The output energy of the pulsed laser oscillators, typically excimer laser, is higher than that of the CW laser oscillators by triple to six digits. Therefore, throughput can be enhanced by shaping a beam spot (a region in which the laser beam is irradiated in fact to the surface of a processing object) into square with several centimeters on a side or linear with not less than 100 mm in length through an optical system and irradiating the laser beam to the semiconductor film effectively. As a result, the pulsed laser oscillators have become popular to be employed for the crystallization of the semiconductor film.

It is noted that "linear" here does not mean a line strictly but means a rectangle (or an oblong) with a large aspect ratio. For example, the expression of "linear" indicates a rectangle with an aspect ratio of two or more (preferably, 10 to 10000), which is still included in a beam spot that is rectangular in shape on the surface of the processing object.

However, the semiconductor film crystallized by using a pulsed laser beam as described above comprises a plurality of crystal grains assembled and the position and the size of the crystal grain are random. Compared to an inside of the crystal grain, a boundary between the crystal grains (crystal grain boundary) has an amorphous structure and an infinite number of recombination centers and trapping centers existing due to crystal defects. It is a problem that when a carrier is trapped in the trapping center, potential of the crystal grain boundary increases to become a barrier against the carrier, and thereby deteriorating a carrier mobility.

In view of such problem, recently, attention has been paid to the technique of irradiating a continuous wave (CW) laser beam to a semiconductor film. In this technique, the CW laser beam is scanned to one direction to grow crystals continuously toward the scanning direction so as to form a plurality of crystal grains comprising single-crystal grains extending long in the direction thereof. It is considered that this technique enables to form a TFT that has almost no crystal grain boundary at least in a channel direction of the TFT.

By the way, it is preferable that the absorption coefficient of the laser beam to the semiconductor film is high in order to crystallize the semiconductor film more effectively. The absorption coefficient to the semiconductor film depends on the material and the like. In case of using a YAG laser or a YVO$_4$ laser to crystallize the silicon film having a thickness of several tens to several hundreds nm which is generally employed for the semiconductor device, the second harmonic which has a shorter wavelength than the fundamental wave is higher in absorption coefficient, and thereby crystallization can be more effective.

However, the energy of the laser beam converted into the second harmonic is lower than that of the fundamental wave. Therefore it is difficult to enhance throughput by enlarging the area of the beam spot. Especially, since the output energy from the CW laser oscillator per unit time is lower than that from the pulsed laser oscillator, throughput is difficult to be enhanced. For example, when a Nd: YAG laser is used, the conversion efficiency from the fundamental wave (wavelength 1064 nm) to the second harmonic (wavelength 532 nm) is about 50%. Moreover, the non-linear optical element which converts the laser beam into the second harmonic does not have enough resistance against the laser beam. For example, the CW YAG laser can output the fundamental wave for 10 kW, while the second harmonic for 10 W. Therefore, in order to obtain necessary energy density for crystallizing the semiconductor film, the area of the beam spot must be narrowed for about $10^{-3}$ mm$^2$, and thereby the CW YAG laser is inferior to the pulsed excimer laser in terms of throughput.

It is noted that in both ends of the beam spot in the direction perpendicular to the scanning direction, there is formed a region where the crystal grain is extremely small and inferior to the center of the beam spot in its crystallinity. Even though a semiconductor element is formed in such a region, a high characteristic cannot be expected. Therefore, it is important to reduce the proportion of the region where the crystallinity is inferior among the regions where the laser beam is irradiated in order to ease the restriction in the layout of the semiconductor element.

SUMMARY OF THE INVENTION

In view of the problem described above, it is an object of the present invention to provide a laser irradiation apparatus for enlarging an area of a beam spot and reducing a proportion of a region where the crystallinity is low. In addition, it is also an object of the present invention to provide a laser irradiation apparatus for enhancing throughput with a CW laser beam. Furthermore, it is an object of the present invention to provide a laser irradiation method and a method for manufacturing a semiconductor device with the laser irradiation apparatus.

According to the laser irradiation method disclosed in the present invention, a region melted by a first pulsed laser beam of higher harmonic is irradiated with a second CW laser beam. Specifically, the first laser beam has a wavelength of visible light or a shorter wavelength than that of visible light (approximately not more than 780 nm). Since the first laser beam melts a semiconductor film, an absorption coefficient of the second laser beam to the semiconductor film increases drastically and thereby the second laser beam is absorbed in the semiconductor film more easily.

FIG. 8A shows the value of absorption coefficient (cm$^{-1}$) to an amorphous silicon film against the wavelength (nm) of the laser beam. In addition, FIG. 8B shows the value of absorption coefficient (cm$^{-1}$) to a poly-crystalline silicon film against the wavelength (nm) of the laser beam. It is noted that these values are calculated by the extinction coefficient obtained with a spectroscopic ellipsometer. When the semiconductor film has an absorption coefficient of not less than $1\times10^4$ cm$^{-1}$ according to FIGS. 8A and 8B, it is considered that the first laser beam can melt the semiconductor film thoroughly. In order to obtain the absorption coefficient of not less than $1\times10^4$ cm$^{-1}$, in case of the amorphous silicon film, it is desirable that the first laser beam has a wavelength of not more than 830 nm (preferably, not more than 780 m). It is noted that the relationship between the wavelength of the first laser beam and the absorption coefficient differs depending on the material, crystallinity or the like of the semiconductor film. Therefore, the wavelength of the first laser beam is not limited to this, and the wavelength of the first laser beam is determined appropriately so that the absorption coefficient becomes not less than $1\times10^4$ cm$^{-1}$.

The laser irradiation apparatus according to the present invention comprises a first laser oscillator generating a first pulsed laser beam with a wavelength of visible light or a shorter wavelength than that of visible light and a second laser oscillator generating a second CW laser beam having a wavelength of fundamental wave. The shape and the position of the beam spots of the first and second laser beam are controlled by a first and a second optical system respectively. And the beam spots of the first and second laser beam are overlapped by these two optical systems. In addition, the laser irradiation apparatus according to the present invention comprises a means to control the relative position of the beam spots of the first and the second laser beam with respect to the processing object.

Thus, the region which is melted by the first laser beam moves in the semiconductor film while keeping its melting state by the second CW laser beam. Therefore, the crystal grains growing toward the scanning direction is continuously formed. By forming the single-crystal grains extending long to the scanning direction, the semiconductor film in which the crystal grain boundary rarely exists at least in the channel direction of TFT can be formed.

The time for which the melting state is kept depends on the balance between the output of the pulsed laser oscillator and the output of the CW laser oscillator. When the next pulsed laser beam is irradiated to the semiconductor film within the time frame for which the melting state can be kept, the annealing of the semiconductor film can be continued as keeping its melting state. In the extreme case, it is possible to find a condition in which once the semiconductor film is melted by the pulsed laser beam, only the irradiation of the CW laser beam is enough to keep its melting state. In such a case, after the pulsed laser beam is irradiated for only one shot, the CW laser beam is irradiated to keep the melting state.

It is noted that the higher harmonic has the lower energy. Therefore, when the first laser beam has the fundamental wave of 1 μm approximately, the second harmonic is most preferable to be used. However, the present invention is not limited to this, and the necessary element for the first laser beam is to have a wavelength of visible light or a shorter wavelength than that of visible light. In addition, since the second laser beam is irradiated for the purpose to aid energy to the first laser beam, the output energy is emphasized rather than the absorption coefficient of the semiconductor film. Therefore, the fundamental wave is preferred for the second laser beam. However, the present invention is not limited to this, and not only the fundamental wave but also the second harmonic can be employed for the second laser beam.

When the fundamental wave is employed for the second laser beam, it is not necessary to convert the wavelength, and thereby the energy does not need to be decreased in consideration of the deterioration of the non-linear optical element. For example, it is possible that the second laser beam is output with the energy of 100 times or more (1000 W or more, for example) compared to the CW laser beam having a wavelength of visible light or a shorter wavelength than that of visible light. Therefore, a cumbersome procedure of maintenance of the non-linear optical element is not necessary any more and the total energy of the laser beam absorbed in the semiconductor film can be increased so that the larger grain crystal can be obtained.

Moreover, the energy of the pulsed laser beam per unit time is higher than that of the CW laser beam. In addition, when the harmonic and the fundamental wave are compared, the energy of the harmonic is lower than that of the fundamental wave. In the present invention, it is noted that the laser beam having a wavelength of harmonic, a wavelength of visible light or a shorter wavelength than that of visible light is generated from the pulsed laser oscillator and the laser beam having a wavelength of the fundamental wave is generated from the CW laser oscillator. Thus, the region in which the beam spots of the harmonic and the fundamental wave as above are overlapped can be greatly enlarged compared with the combination that the laser beams of both the harmonic and the fundamental wave are generated from the CW laser oscillators, and the combination that the laser beam of the harmonic is generated from the CW laser oscillator while the laser beam of a fundamental wave is generated from the pulsed laser oscillator.

An overlapping of the two beam spots formed by two laser beams is explained as exemplifying a CW YAG laser and a pulsed excimer laser.

FIG. 1A shows an aspect in which the beam spot 10 of the CW YAG laser having a fundamental wave and the beam spot 11 of the CW YAG laser having a second harmonic are overlapped. The YAG laser of the fundamental wave can output the energy for 10 kW approximately. On the other hand, the YAG laser of the second harmonic can output the energy for 10 W approximately.

When 100% of the energy of the laser beam is assumed to be absorbed in the semiconductor film, it is possible to enhance crystallinity by setting the energy density of the laser beam for 0.01 MW/cm$^2$ to 100 MW/cm$^2$. Therefore, the energy density here is set to be 1 MW/cm$^2$.

And when it is assumed that the shape of the beam spot 10 of the CW YAG laser having a fundamental wave is rectangular, the length of the minor axis is $L_{X1}$, and the length of the major axis is $L_{Y1}$, in order to satisfy the energy density described above, $L_{X1}$ is set to be between 20 μm and 100 μm. For example, it is appropriate that when $L_{X1}$ is 20 μm, $L_{Y1}$ is set to be 50 mm approximately, and when $L_{X1}$ is 30 μm, $L_{Y1}$ is set to be 30 mm approximately.

On the other hand, when it is assumed that the shape of the beam spot 11 of the CW YAG having a second harmonic is rectangular, the length of the minor axis is $L_{X2}$, and the length of the major axis is $L_{Y2}$, in order to satisfy the energy density described above, $L_{X2}$ is set to be between 20 μm and 100 μm. For example, it is appropriate that when $L_{X2}$ is 10 μm, $L_{Y2}$ is set to be 100 μm approximately.

The area of the region in which the beam spot 10 of the CW YAG laser having a fundamental wave and the beam spot 11 of the CW YAG laser having a second harmonic are overlapped corresponds to the beam spot 11 when it is assumed that the beam spot 10 and the beam spot 11 are completely overlapped.

Next, FIG. 1B shows an aspect in which the beam spot 10 of the CW YAG laser having the fundamental wave and the beam spot 12 of the pulsed excimer laser are overlapped. The pulsed excimer laser can output energy for 1 J per a pulse. And when the pulse width is set to be 30 ns approximately, the output per unit time is 30 MW. Therefore, when it is assumed that the shape of the beam spot 12 generated from the pulsed excimer laser is rectangular, the length of the minor axis is $L_{X3}$, and the length of the major axis is $L_{Y3}$, in order to satisfy the energy density described above, $L_{X3}$ is set to be between 20 μm and 500 μm. For example, it is appropriate that when $L_{X3}$ is 400 μm, $L_{Y3}$ is set to be 300 mm approximately.

The area of the region in which the beam spot 10 of the CW YAG laser having the fundamental wave and the beam spot 12 of the pulsed excimer laser are overlapped corresponds to the area of the beam spot 10 when it is assumed that the beam spot 10 and the beam spot 12 are completely overlapped.

Therefore, the combination of the first CW laser beam and the second pulsed laser beam according to the present invention is superior to the combination of the first CW laser beam and the second CW laser beam as shown in FIG. 1A since the former combination can enlarge considerably the region in which the two laser beams are overlapped and thereby throughput can be enhanced.

It is noted that the number of the laser beams is not limited to two, but more than two laser beams can be also applied to the present invention. A plurality of laser beams having a harmonic can be used for the first laser beam. In addition, a plurality of laser beams can be used for the second laser beam.

It is noted that by shaping the beam spot into linear, the width of the major axis of the linear beam spot in the region where the crystal grain which is crystallized along the scanning direction is assembled can be made as broad as possible. That is to say, in the whole area of the linear beam spot, the proportion of the area of the region where the crystallinity is low formed in both ends of the linear beam spot thereof can be decreased. In the present invention, however, the shape of the beam spot is not limited to linear, but it does not lead to any problems even if the shape is rectangular or planar provided that the sufficient annealing can be performed to the object to be irradiated.

It is noted that the first laser beam can be obtained from the pulsed laser oscillator such as an Ar laser, a Kr laser, an excimer laser, a $CO_2$ laser, a YAG laser, a $Y_2O_3$ laser, a $YVO_4$ laser, a YLF laser, a $YAlO_3$ laser, a glass laser, a ruby laser, an alexandrite laser, a Ti: sapphire laser, a copper vapor laser or a gold vapor laser.

In addition, the second laser beam can be obtained from the CW laser oscillator such as an Ar laser, a Kr laser, a $CO_2$ laser, a YAG laser, a $Y_2O_3$ laser, a $YVO_4$ laser, a YLF laser, a $YAlO_3$ laser, an alexandrite laser, a Ti: sapphire laser or a helium-cadmium laser.

It is noted that in the process for crystallizing the semiconductor film with the CW laser beam, throughput can be enhanced by shaping the beam spot into an elliptical or rectangular beam spot extending long to one direction and scanning the beam spot thereof to the direction of the minor axis of the beam spot to crystallize the semiconductor film. The beam spot can be shaped into an elliptical beam spot because the original shape of the laser beam is circular or near-circular shape. When the original shape is rectangular, the laser beam may be shaped into a rectangle whose major axis is further extended long by being enlarged through an optical system such as a cylindrical lens. In addition, plural laser beams are shaped into an elliptical or rectangular extending long in one direction respectively and are made to be chained to one direction so as to form a longer beam in order to enhance throughput.

[Effect of the Invention]

According to the present invention, the absorption coefficient of the fundamental wave to the semiconductor film is increased by irradiating the first laser beam having a wavelength of visible light or a shorter wavelength than that of visible light to melt the semiconductor film. By irradiating the first pulsed laser beam, the area of the beam spot can be enlarged than that when irradiated by the CW laser beam. And by irradiating the second laser beam having a fundamental wave to the melted semiconductor film, the second laser beam is absorbed effectively in the semiconductor film in which the absorption coefficient of the fundamental wave is increased. As a result, since the major axis of the beam spot can be made long, throughput of the laser crystallization can be enhanced and it is effective to ease the design rule.

It is noted that the region which is melted by the first laser beam and in which the absorption coefficient is increased can be moved by scanning the second laser beam and thereby the region where the crystal grains growing along the scanning direction is packed can be formed. Moreover, even after the first laser irradiation is over, the melted region thereof where the absorption coefficient is increased can be moved to one direction to some extent by the scanning of the second laser beam.

Furthermore, since the laser beam having a fundamental wave is employed as the second laser beam, it is not necessary any more to consider the resistance of the non-linear optical element which is used to convert the wavelength of the laser beam into the higher harmonic. Therefore, the laser beam generated from the laser oscillator having considerably high output, for example the laser oscillator generating 100 times or more output energy than the second harmonic can be employed as the second laser beam. And the maintenance of the non-linear optical element due to the change of its quality does not have to be taken into consideration any more. Especially the present invention can take advantage of the solid laser that is to keep the maintenance-free state long.

DETAILED DESCRIPTION OF THE PREFERRED EMBODIMENTS

Embodiment Mode 1

Figure 1A:
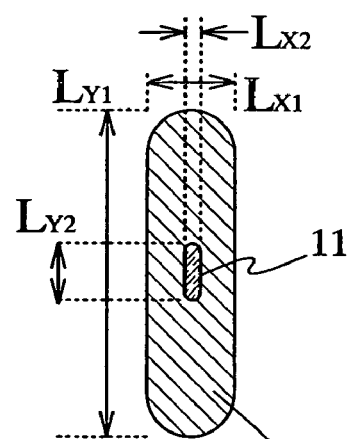
FIGS. 1A and 1B are drawings showing a magnitude relation of the beam spots.
Figure 1B:
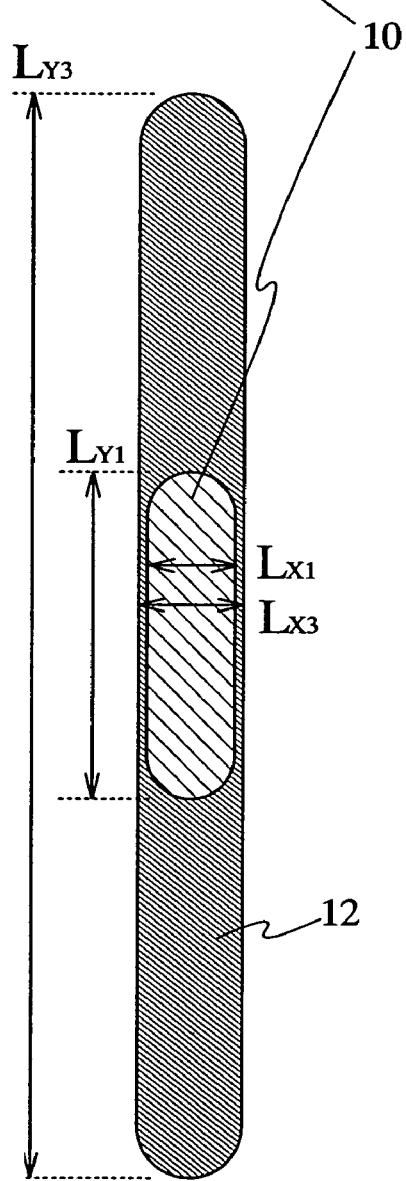
Figure 2:
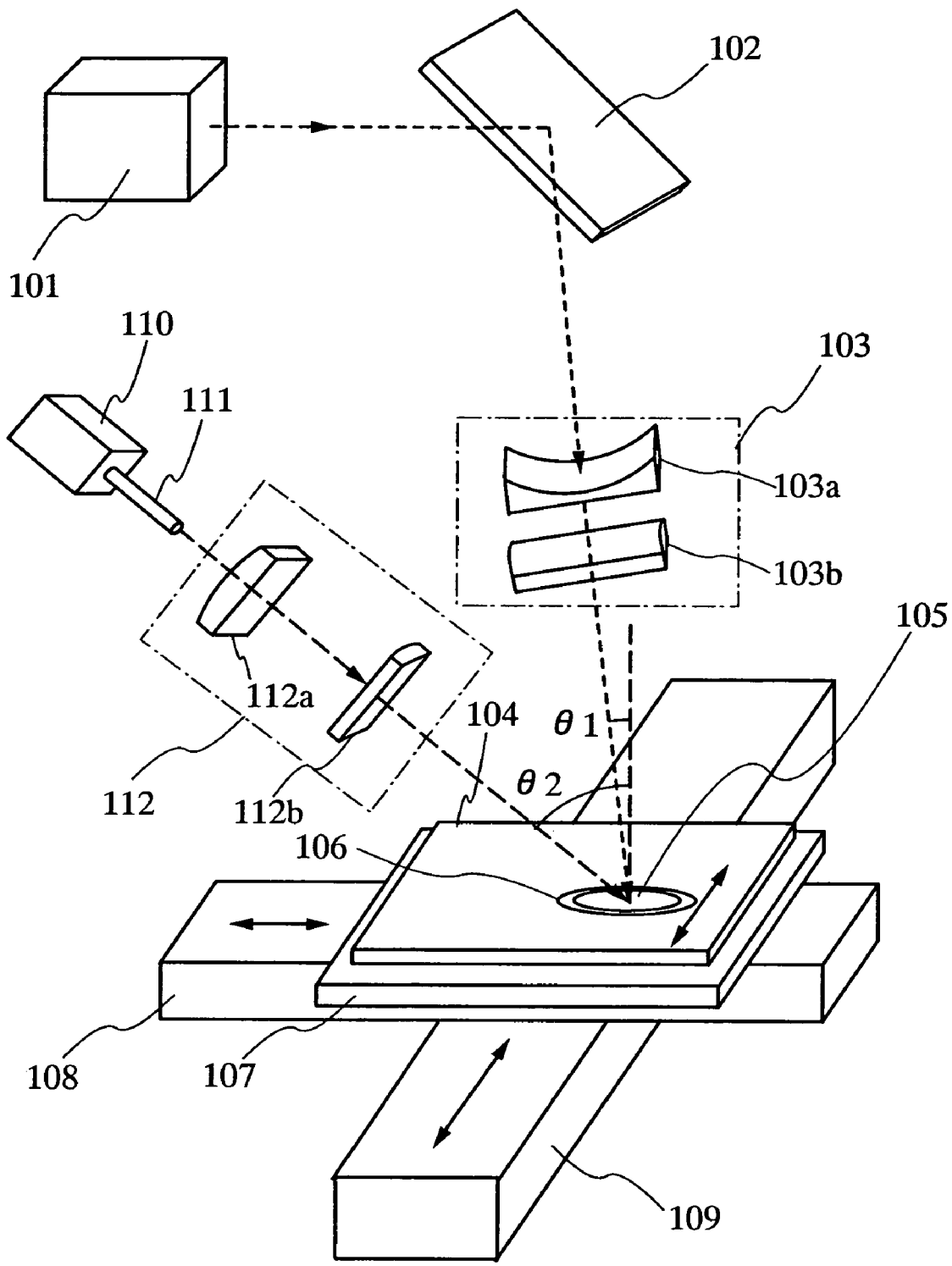
FIG. 2 is a drawing showing the structure of the laser irradiation apparatus according to the present invention.

The structure of the laser irradiation apparatus according to the present invention is explained with using FIG. 2.

Reference numeral 101 denotes a pulsed laser oscillator, and a Nd: YLF laser that outputs 6 W is used as the laser oscillator 101 in this embodiment mode. The laser oscillator 101 operates in a $TEM_{00}$ mode and includes the non-linear optical element to convert the wavelength of the laser beam into the second harmonic. The higher harmonic is also available but the second harmonic is superior in terms of the energy efficiency to the other higher harmonics. The frequency is 1 kHz and the pulse width is 60 ns approximately. In this embodiment mode, the solid laser that outputs 6 W approximately is used but a large-scaled laser oscillator that outputs as much as 300 W, for example aXeCl excimer laser, can be also employed.

It is noted that the non-linear optical element may be provided inside the resonator included in the oscillator or the resonator equipped the non-linear optical element may be provided outside the oscillator generating the laser beam having the fundamental wave. The former structure has an advantage that the apparatus can be made small and thereby the accurate control of the length of the resonator is not necessary any more. On the other hand, the latter structure has an advantage that the interaction of the fundamental wave and the harmonic can be ignored.

As the non-linear optical element, the crystal whose non-linear optical constant is relatively large such as KTP ($KTiOPO_4$), BBO ($\beta\text{-}BaB_2O_4$), LBO ($LiB_3O_5$), CLBO ($CsLiB_6O_{10}$), GdYCOB ($YCa_4O(BO_3)_3$), KDP ($KD_2PO_4$), $KB_5$, $LiNbO_3$, $Ba_2NaNb_5O_{15}$ or the like is used. Especially, the crystal such as LBO, BBO, KDP, KTP, KB5, CLBO or the like can enhance conversion efficiency from the fundamental wave into the higher harmonic.

Since the laser beam is generally generated to the horizontal direction, the first laser beam generated from the laser oscillator 101 is reflected by the reflecting mirror 102 and is changed its traveling direction so as to have an angle (incident angle) of θ1 from the vertical direction. In this embodiment mode, θ1 is determined to 21°. The beam spot of the first laser beam of which the traveling direction is changed is transformed by the lens 103 and is irradiated to the processing object 104. In FIG. 2, the reflecting mirror 102 and the lens 103 correspond to the optical system that controls the shape and the position of the beam spot of the first laser beam.

In FIG. 2, a planoconcave cylindrical lens 103a and a planoconvex cylindrical lens 103b are used as the lens 103.

The planoconcave cylindrical lens 103a has a radius of curvature of 10 mm and a thickness of 2 mm and is arranged in the position 29 mm away from the surface of the processing object 104 along the optical axis when the traveling direction of the fist laser beam is assumed to be the optical axis. And the generating line of the planoconcave cylindrical lens 103a is made to be perpendicular to the incident plane of the first laser beam which incidents into the processing object 104.

The planoconvex cylindrical lens 103b has a radius of curvature of 15 mm and a thickness of 2 mm and is arranged in the position 24 mm away from the surface of the processing object 104 along the optical axis. And the generating line of the planoconvex cylindrical lens 103b is made to be parallel to the incident plane of the first laser beam which incidents into the processing object 104.

Thus, a first beam spot 106 having a size of 3 mm×0.2 mm is formed on the processing object 104.

Moreover, reference numeral 110 denotes a CW laser oscillator, and a Nd: YAG laser that outputs 2 kW is used as the laser oscillator 110 in this embodiment mode. The second laser beam generated from the laser oscillator 110 is transmitted through an optical fiber 111 of φ300 μm. The optical fiber 111 is arranged so that the exit wound thereof has an angle of θ2 to the vertical direction. In this embodiment mode, the angle θ2 is determined to 45°. In addition, the exit wound of the optical fiber 111 is arranged in the position 105 mm away from the processing object 104 along the optical axis of the second laser beam emitted from the laser oscillator 110 and the optical axis thereof is made to be included in the incident plane.

The shape of the second laser beam emitted from the optical fiber 111 is changed through the lens 112 and it is irradiated to the processing object 104. In FIG. 2, the optical fiber 111 and the lens 112 correspond to the optical system which controls the shape and the position of the beam spot of the second laser beam.

In FIG. 2, the planoconvex cylindrical lens 112a and the planoconvex cylindrical lens 112b are used as the lens 112.

The planoconvex cylindrical lens 112a has a radius of curvature of 15 mm and a thickness of 4 mm, and is arranged 85 mm away from the surface of the processing object 104 along the optical axis of the second laser beam. The direction of the generating line of the planoconvex cylindrical lens 112a is made to be perpendicular to the incident plane.

The planoconvex cylindrical lens 112b has a radius of curvature of 10 mm and a thickness of 2 mm, and is arranged 25 mm away from the surface of processing object 104 along the optical axis of the second laser beam.

Thus, the second beam spot 105 with a size of 3 mm×0.1 mm is formed on the processing object 104.

In this embodiment mode, the substrate on which the semiconductor film is formed is arranged as the processing object 104 so as to be parallel to the horizontal plane. The semiconductor film is formed over the surface of the glass substrate, for example. The substrate over which the semiconductor film is formed is the glass substrate having a thickness of 0.7 mm, which is fixed on the absorption stage 107 in order not to fall down in irradiating the laser beam.

The absorption stage 107 is able to move in both X and Y directions in the parallel plane to the processing object 104 by the uniaxial robot for the X axis 108 and the uniaxial robot for the Y axis 109.

It is noted that in case of annealing the semiconductor film formed over the substrate which is transparent to the laser beam, in order to realize the uniform irradiation of the laser beam, it is desirable that an incident angle "φ" of the laser beam satisfies the inequality of $\phi \geq \arctan(W/2d)$ when an incident plane is defined as a plane that is perpendicular to the surface to be irradiated and is including a longer side or a shorter side of the laser beam assuming that a shape of the laser beam is rectangular. In the inequality, "W" is a length of the longer side or the shorter side included in the incident plane and "d" is a thickness of the substrate which is transparent to the laser beam, which is placed at the surface to be irradiated. In case of using a plurality of laser beams, the inequality needs to be satisfied with respect to each of the plurality of laser beams. It is noted that the incident angle "φ" is determined by an incident angle when the track of the laser beam is projected to the incident plane in case that the track is not on the incident plane. When the laser beam is incident at an angle of "φ", it is possible to perform uniform irradiation of the laser beam without interference of reflected beam from a surface of the substrate with reflected beam from a rear surface of the substrate. The above theory is considered assuming that a refractive index of the substrate is 1. In fact, the substrate mostly has a refractive index around 1.5, and a larger calculated value than the angle calculated in accordance with the inequality is obtained when the value around 1.5 is considered. However, since the laser beam at the irradiated surface has energy attenuated at both sides in the longitudinal direction thereof, the interference has only a small influence on the both sides and the value calculated in accordance with the inequality is enough to obtain the effect of attenuating the interference. This theory is applied to both of the first laser beam and the second laser beam, and it is preferable that both of them satisfy the inequality. However, as for the excimer laser beam, for example, whose coherent length is extremely short, does not necessarily satisfy the inequality. The above inequality of "φ" is effective only when the substrate is transparent to the laser beam.

Generally, the glass substrate is transparent to the laser beam with the fundamental wave whose wavelength is about 1 μm, and to the green laser beam of the second harmonic. In order that this lens satisfies the inequality, the positions of the planoconvex cylindrical lens 103b and the planoconvex cylindrical lens 112b are displaced in the perpendicular direction to the incident plane so as to have an angle of φ1, φ2 respectively in the plane perpendicular to the surface of processing object 104 including the minor axis of the beam spot. In such a case, the interference does not occur when the first beam spot 106 has an angle of φ1=10° approximately, and the second beam spot 105 has an angle of φ2=10° approximately.

In addition, it is preferable that the first laser beam and the second laser beam are generated in $TEM_{00}$ mode (single mode) obtained from a stable resonator. In case of $TEM_{00}$ mode, since the laser beam has the Gaussian energy distribution and is superior in condensing the laser beam, it is easy to process the shape of the beam spot.

When the substrate over which the semiconductor film is formed is used as the processing object 104, the silicon oxynitride is formed 200 nm in thickness on one side of the glass substrate having a thickness of 0.7 mm and an amorphous silicon (a-Si) film is formed 70 nm in thickness on it as the semiconductor film with a plasma CVD method. In addition, in order to improve resistance of the semiconductor film against the laser beam, the thermal annealing is performed on the amorphous silicon film at the temperature of 500° C. for an hour. In addition to the thermal annealing, the crystallization of the semiconductor film utilizing the metal with the catalytic actiivity may be performed. In both cases, an optimum condition in irradiating a laser beam is almost the same.

And the second beam spot 105 is scanned on the processing object 104 (the substrate over which the semiconductor film is formed) in the direction of the minor axis of the second beam spot 105 by the uniaxial robot for the Y axis 109. Here, the output of both the laser oscillator 101 and 110 are that indicated in the specification. By the scanning of the processing object 104, the first beam spot 106 and the second beam spot 105 are scanned relatively to the surface of the processing object 104.

Since the region where the first beam spot 106 is irradiated in the semiconductor film melts, the absorption coefficient of the region thereof to the second CW laser beam increases considerably. Therefore, in the region which has a width of 1 mm to 2 mm corresponding to the major axis of the second beam spot 105 and extends long to the scanning direction, the single-crystal grains growing to the scanning direction are formed in a packed state.

It is noted that in the region where the first beam spot 106 and the second beam spot 105 are overlapped, the state which the absorption coefficient is increased by the first laser beam having the second harmonic is kept by the second laser beam having the fundamental wave. Therefore, even after the first laser beam stopped to be irradiated, the state where the absorption coefficient is increased by the first laser beam of the second harmonic is kept by the second laser beam having the fundamental wave that is irradiated next. Therefore, even after the first laser beam of the second harmonic stopped to be irradiated, the melted region in which the absorption coefficient is increased can be moved to one direction to some extent by the scanning of the second laser beam, and thus the crystal grains growing toward the scanning direction are formed. And in order to keep the region where the absorption coefficient is increased during the process of the scanning continuously, it is desirable that the first laser beam of the second harmonic is irradiated again to aid the energy.

It is appropriate that the scanning speed of the first beam spot 106 and the second beam spot 105 is between several cm/s and several hundreds cm/s, and here the scanning speed is set to 50 cm/s.

Figure 3:
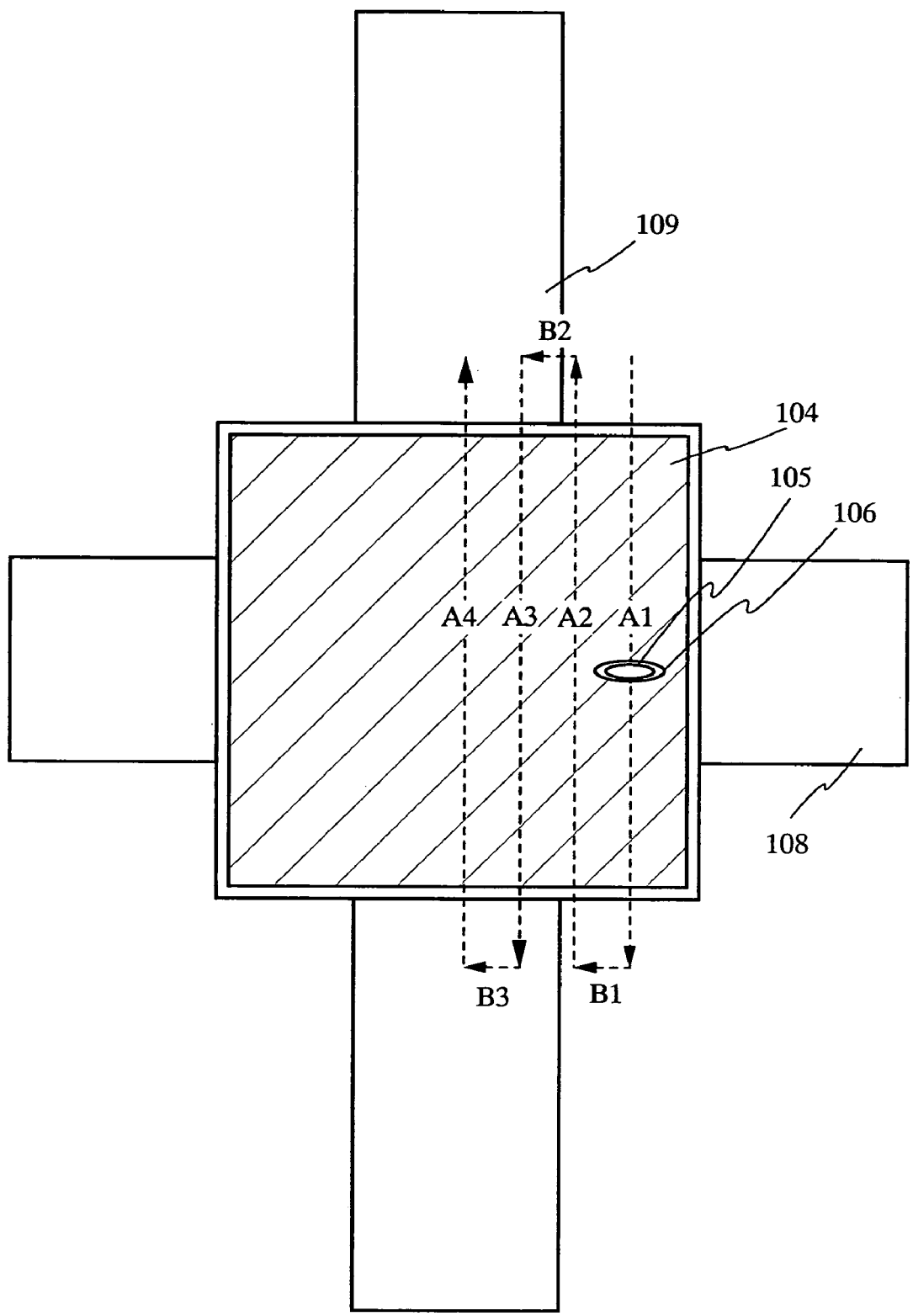
FIG. 3 is a drawing showing the scanning route of the processing object according to the laser irradiation method in the present invention.

Next, FIG. 3 shows the scanning route of the first beam spot 106 and the second beam spot 105 on the surface of the processing object 104. In case that the second laser beam is irradiated on the whole surface of the semiconductor film, that is the processing object 104, after the scanning to one direction is performed with a uniaxial robot for the Y axis 109, the first beam spot 106 and the second beam spot 105 are slided with the uniaxial robot for the X axis 108 to the direction perpendicular to the scanning direction by the uniaxial robot for the Y axis 109.

For example, the semiconductor film is scanned to one direction at the scanning speed of 50 cm/s by the uniaxial robot for the Y axis 109. In FIG. 3, the scanning route of the first beam spot 106 and the second beam spot 105 is indicated by reference character A1. Then the first beam spot 106 and the second beam spot 105 are slided to the direction perpendicular to the scanning route A1 by the moving the uniaxial robot for the X axis 108. The scanning route of the first beam spot 106 and the second beam spot 105 by the uniaxial robot for the X axis 108 is indicated by reference character B1 in FIG. 3. Next, the first beam spot 106 and the second beam spot 105 are slided to the direction opposite to the scanning route A1 with the uniaxial robot for the Y axis 109. This scanning route of the first beam spot 106 and the second beam spot 105 is indicated by reference character A2. Next, the first beam spot 106 and the second beam spot 105 are slided to the direction perpendicular to the scanning route A2 by the moving the uniaxial robot for the X axis 108. The scanning route of the first beam spot 106 and the second beam spot 105 by the uniaxial robot for the X axis 108 is indicated by reference character B2 in FIG. 3. By repeating the scanning with the uniaxial robot for the Y axis 109 and the uniaxial robot for the X axis 108 in order, the second laser beam or the first laser beam can be irradiated on the whole surface of the processing object 104.

It is desirable that the length of the scanning route B1, B2 . . . is between 1 mm and 2 mm that corresponds to the width of the major axis of the second beam spot 105.

The region where the second laser beam is irradiated and the crystal grains growing along the scanning direction is formed has very high crystallinity. Therefore, when the region thereof is employed as a channel forming region for TFT, very high mobility and on-current can be expected. However, in case that the region where such excellent characteristic is not necessary exists in the semiconductor film, the laser beam may not be irradiated on such regions. Or the laser beam may be irradiated under the conditions where the high crystallinity is not obtained by increasing the scanning speed, for example. When the scanning speed is set to 2 m/s, the a-Si film can be crystallized but it is difficult to form the region where the crystal grains are grown to the scanning direction continuously as described above. Moreover, by increasing the scanning speed partially, throughput can be further enhanced.

It is noted that there are some methods for the scanning the laser beam. One is the irradiation system moving type method, where the irradiation position of the laser beam is moved while the substrate as the processing object is fixed. Another is the object moving type method, where the substrate is moved while the irradiation position of the laser beam is fixed. There is one more type where these types are combined. Since the laser irradiation apparatus according to the present invention includes at least two laser beams of the first laser beam and the second laser beam, it is appropriate to employ the object moving type method which can simplify the optical system the most. However, the laser irradiation apparatus according to the present invention is not limited to this, it is not impossible to employ any one of types described above by devising the optical system. In any cases, it is premised that the moving direction of each beam spot relative to the semiconductor film can be controlled.

It is noted that the optical system is not limited to that shown in this embodiment mode.

Embodiment Mode 2

Figure 4A:
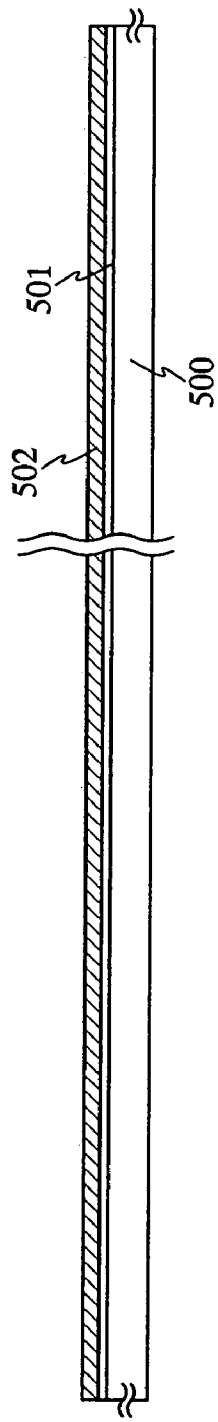
FIGS. 4A to 4C are drawings showing the method for manufacturing a semiconductor device.
Figure 4B:
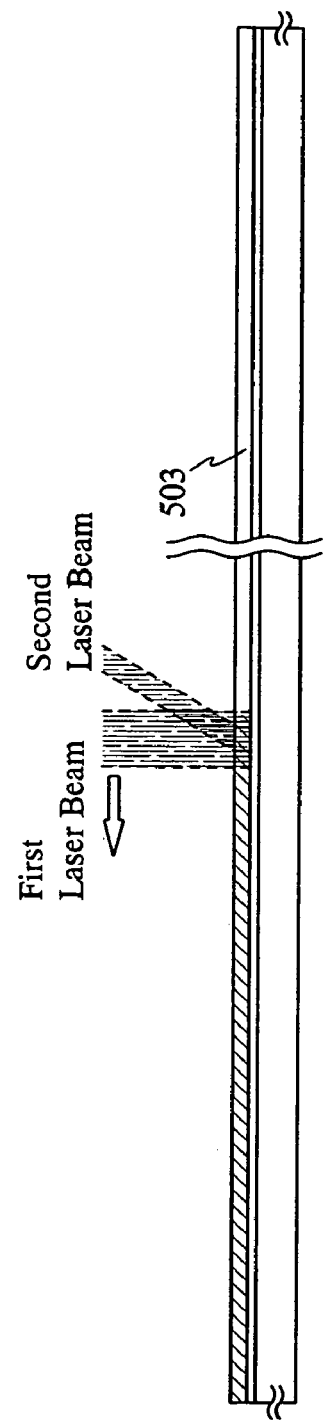
Figure 4C:
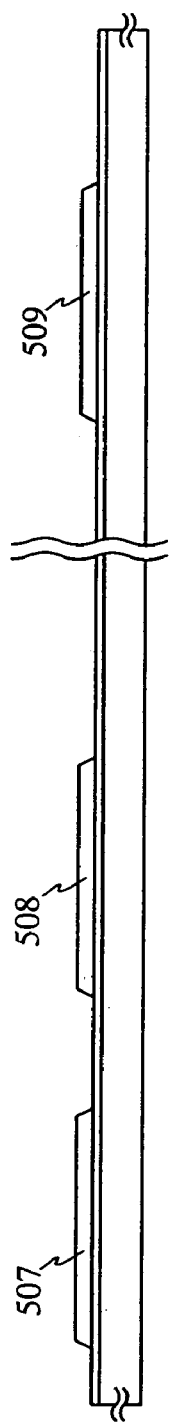

In this embodiment mode, the method for irradiating a laser beam and the method for manufacturing a semiconductor device according to the present invention is explained with FIGS. 4A to 4C.

First of all, a base film 501 is formed on a substrate 500 as shown in FIG. 4A. A glass substrate such as a barium borosilicate glass, an aluminum borosilicate glass or the like, a quartz substrate, an SUS substrate or the like can be given as the substrate 500. Besides, though the substrate comprising the plastic typically polyethilene terephthalate (PET), polyethersulfone (PES), and polyethylene naphthalate (PEN) or acryl synthetic-resin with flexibility such as acryl or the like is inferior to the substrate above in terms of the resistance against the heat, it can be utilized provided that the substrate can resist against the heat generated in the manufacturing processes.

The base film 501 is provided in order to prevent that alkaline-earth metal or alkaline metal such as Na comprised in the substrate 500 diffuses to the semiconductor film to have an adverse affect on a characteristic of a semiconductor element. Therefore, the base film 501 is formed of an insulating film such as silicon oxide, silicon nitride, silicon nitride oxide or the like which can prevent diffusion of alkaline metal or alkaline-earth metal to the semiconductor film. In this embodiment mode, silicon nitride oxide film is formed 10 nm to 400 nm in thickness (preferably 50 nm to 300 nm in thickness) by a plasma CVD method.

It is noted that the base film 501 may be formed in a single-layer structure or a laminated-layer structure of plural insulating films. In addition, when the substrate comprising the alkaline metal or alkaline-earth metal at all such as the glass substrate, SUS substrate, or plastic substrate is used, it is effective to provide the base film for the purpose of preventing the diffusion of the impurities. When the diffusion of the impurities, for example from the quartz substrate, does not lead to such a problem, the base film is not necessarily provided.

Next, a semiconductor film 502 is formed on the base film 501. The semiconductor film 502 is formed 25 nm to 100 nm in thickness (preferably 30 nm to 60 nm). It is noted that an amorphous semiconductor may be employed as the semiconductor film 502 and so may a poly-crystalline semiconductor. Not only the silicon, but also the silicon germanium can be used as the semiconductor. When the silicon germanium is used, the concentration of the germanium is preferable between 0.01 atomic % and 4.5 atomic %.

And then, the first laser beam and the second laser beam are irradiated to the semiconductor film 502 for crystallization with the laser irradiation apparatus according to the present invention.

In this embodiment mode, the first laser beam is emitted from YLF laser that outputs 6 W, with the energy of 6 mJ/pulse, in a oscillation mode of $TEM_{00}$, of the second harmonic (527 nm), at a frequency of 1 kHz, and has a pulse width of 60 ns. It is noted that the first laser beam is processed through the optical system so that the first beam spot formed on the surface of the semiconductor film 502 may become a rectangle having a length of 200 μm in minor axis, 3 mm in major axis and the energy density may become 1000 mJ/cm$^2$.

In addition, in this embodiment mode, the second laser beam is emitted from YAG laser that outputs 2 kW of the fundamental wave (1.064 μm). The second laser beam is processed through the optical system so that the second beam spot formed on the surface of the semiconductor film 502 may become a rectangle having a length of 100 μm in minor axis, 3 mm in major axis and the energy density may become 0.7 MW/cm$^2$.

Then, the first beam spot and the second beam spot are irradiated so as to be overlapped on the surface of the semiconductor film 502 and are scanned to the direction indicated by a white arrow in FIG. 4B. Since the semiconductor film 502 is melted by the first laser beam, the absorption coefficient of the fundamental wave to the semiconductor film 502 increases and as a result the energy of the second laser beam is easily absorbed in the semiconductor film 502. And the region which is melted by the irradiation of the second laser beam moves in the semiconductor film 502, and thereby the crystal grains which grow continuously to the scanning direction are formed. By forming the single-crystal grains extending long to the scanning direction, the semiconductor film where the crystal grain boundary is rarely seen at least in the channel direction of TFT can be formed.

Moreover, the laser beam may be irradiated in the atmosphere of the inactive gas such as noble gas, nitrogen or the like. By doing this, the roughness of the semiconductor film by the irradiation of the laser beam can be suppressed. Furthermore, the variation of the threshold value due to the variation of the interface state density can be suppressed.

A semiconductor film 503 in which the crystallinity is more enhanced is formed by the irradiating the laser beam to the semiconductor film 502 as described above.

Next, as shown in FIG. 4C, the semiconductor film 503 is patterned to form island shaped semiconductor film 507 to 509, and various kinds of semiconductor element typically TFT are formed with using the island shaped semiconductor film 507 to 509.

When TFT is manufactured for example, a gate insulating film (not shown in the figure) is formed so as to cover the island shaped semiconductor film 507 to 509. Silicon oxide, silicon nitride, silicon nitride oxide or the like can be employed as the gate insulating film. As for its forming method, a plasma CVD method, a sputtering method, or the like can be employed.

Then, after a conductive film is formed on the gate insulating film, a gate electrode is formed by patterning the conductive film. Then a source region, a drain region, an LDD region or the like are formed by adding the impurities which impart n-type or p-type conductivity to the island shaped semiconductor film 507 to 509 with using the gate electrode and the resist which is formed and patterned as a mask.

TFT can be thus formed through a series of these processes. It is noted that the method for manufacturing a semiconductor device is not limited to the processes for manufacturing the TFT above after forming the island shaped semiconductor film. By employing the semiconductor film crystallized by the method for irradiating the laser beam according to the present invention as an active layer of TFT, a variation of the mobility between the elements, threshold value, and on-current can be suppressed.

The conditions for irradiating the first laser beam and the second laser beam are not limited to those shown in this embodiment mode.

For example, the first laser beam may be emitted from a YAG laser that outputs 4 W, with the energy of 2 mJ/pulse, in a oscillation mode of $TEM_{00}$, of the second harmonic (532 nm), at a frequency of 1 kHz, and has a pulse width of 30 ns. Or the first laser beam may be emitted from a $YVO_4$ laser that outputs 5 W, with the energy of 0.25 mJ/pulse, in a oscillation mode of $TEM_{00}$, of the third harmonic (355 nm), at a frequency of 20 kHz, and has a pulse width of 30 ns, for example. In addition, the first laser beam may be emitted from a $YVO_4$ laser that outputs 3.5 W, with the energy of 0.233 mJ/pulse, in a oscillation mode of $TEM_{00}$, of the fourth harmonic (266 nm), at a frequency of 15 kHz, and has a pulse width of 30 ns, for example.

Concerning the second laser beam, the second laser beam may be emitted from a Nd: YAG laser that outputs 500 W of the fundamental wave (1.064 μm). And the laser beam emitted form a Nd: YAG laser that outputs 2000 W of the fundamental wave (1.064 μm) is also used as the second laser beam.

Moreover, the process to crystallize utilizing the metal with the catalytic activity may be added before the crystallization by the laser beam. As the metal with the catalytic activity, germanium(Ge), Ferrum(Fe), Palladium(Pd), Tin(Sn), Lead (Pb), Cobalt(Co), Platinum(Pt), Copper(Cu), Gold(Au) are given. When the crystallizing process by the laser beam is performed after the crystallizing process utilizing the metal with the catalytic activity, the crystal formed in crystallization with the element with the catalytic activity leaves without being melted by the irradiation of the laser beam in the side nearer to the substrate, and the crystallization is promoted by having the crystal as its nucleus. Therefore, the crystallization by the irradiation of the laser beam is likely to be promoted uniformly from the side of the substrate to the side of the surface of the semiconductor film. Compared to the case in which the semiconductor film is crystallized only by the laser beam, the crystallinity of the semiconductor film can be further enhanced and the roughness of the surface of the semiconductor after the laser beam is irradiated can be suppressed. The variation of the characteristics of the semiconductor element, typically the TFT, which is to be formed afterward, can be suppressed and the off-current can be also suppressed.

It is noted that the laser beam may be irradiated in order to further enhance the crystallinity after the element with the catalytic activity is added to the semiconductor film and is heated in order to promote the crystallization. The heating process may be omitted. Specifically, after adding the element with the catalytic activity, the laser beam is irradiated to the semiconductor film instead of the heating process in order to enhance the crystallinity.

This embodiment mode shows an example where the method for irradiating the laser beam disclosed in the present invention is employed to crystallize the semiconductor film, but the method thereof can be also employed to activate the impurities doped in the semiconductor film.

The method for manufacturing a semiconductor device can be applied to manufacture the integrated circuits and the semiconductor display device. Especially, when the method according to the present invention is applied to the transistor provided in the pixel portions in the liquid crystal display device, in the light emitting device having the light emitting element, typically the organic light emitting element, equipped in each pixel, and in the semiconductor display device such as DMD (Digital Micromirror Device), PDP (Plasma Display Panel), FED (Field Emission Display) or the like, it can be suppressed that the lateral fringe appears in the pixel portion due to the variation of the energy distribution of the laser beam irradiated.

Embodiment

An embodiment in which the present invention is applied is explained as follows.

Embodiment 1

This embodiment shows one example of the laser irradiation apparatus applying the present invention.

Figure 5:
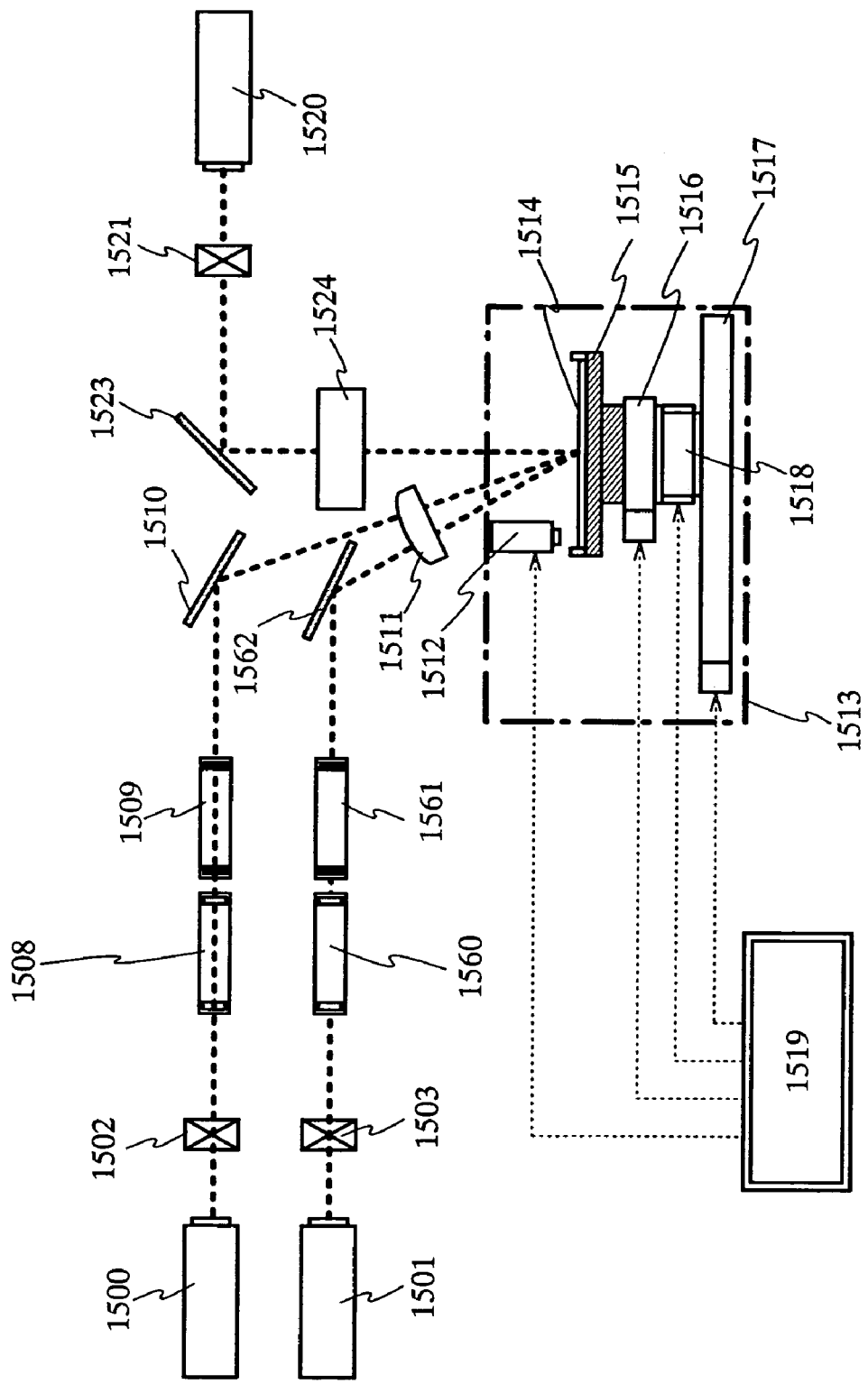
FIG. 5 is a drawing showing the structure of the laser irradiation apparatus according to the present invention.

FIG. 5 shows a structure of the laser irradiation apparatus in this embodiment. In this embodiment, a first pulsed laser beam having a wavelength of visible light or a shorter wavelength than that of visible is emitted from a laser oscillator 1520. And second CW laser beams are emitted from two laser oscillators 1500 and 1501.

In this embodiment, an excimer laser is used as the laser oscillator 1520, which outputs the energy of 1 J per a pulse, with a pulse width of 30 ns approximately, that is to say the laser oscillators 1520 outputs 30 MW per unit time. In addition, both of the laser oscillators 1500 and 1501 are YAG lasers which output 10 kW respectively.

After the first laser beam emitted from the laser oscillator 1520 is reflected by the mirror 1523, the first laser beam is shaped into rectangular, elliptical or linear through the optical system 1524 and is irradiated to the processing object 1514. It is noted that in this embodiment a shutter 1521 to obscure the first laser beam is provided between the laser oscillator 1520 and the mirror 1523, but the shutter 1521 is not necessarily provided. Moreover, the optical system 1524 may be whatever can shape the beam spot into linear, rectangular, or elliptical in order to condense the beam spot thereof, and homogenize the energy distribution.

On the other hand, the second laser beams emitted from the laser oscillators 1500 and 1501 are incident into beam expanders 1508 and 1560 respectively. In this embodiment, shutters 1502 and 1503 to obscure the second laser beams are provided between the laser oscillator 1500 and the beam expander 1508, and between the laser oscillator 1501 and the beam expander 1560 respectively, but the shutters are not necessarily provided.

And through the beam expanders 1508 and 1560, the divergence of the second laser beam which is incident into the beam expanders can be suppressed and in addition, the size of the sectional shape of the laser beam can be controlled.

The second laser beams output from the beam expanders 1508 and 1560 is extended through the cylindrical lens 1509 and 1561 so that the sectional shape of the laser beams may become rectangular, elliptical or linear. And the extended second laser beams are reflected by the mirror 1510 and 1562 respectively and both are incident into the lens 1511. The incident laser beams are condensed so as to become linear through the lens 1511 and is irradiated to the processing object 1514 in the laser irradiation chamber 1513. In this embodiment, a cylindrical lens is used as a lens 1511, but any other lens can be employed as the lens 1511 provided that the lens can shape the beam spot into rectangular, elliptical, or linear.

In this embodiment, the mirror 1523 and the optical system 1524 correspond to the optical system dealing with the first laser beam. On the other hand, the beam expanders 1508, 1560, the cylindrical lens 1509, 1561, and the mirror 1510, 1562 correspond to the optical system dealing with the second laser beams. With these two optical systems, the first beam spot formed by the first laser beam on the surface of the processing object 1514 and the second beam spot formed by the second laser beams on the surface of the processing object 1514 can be overlapped.

Figure 7:
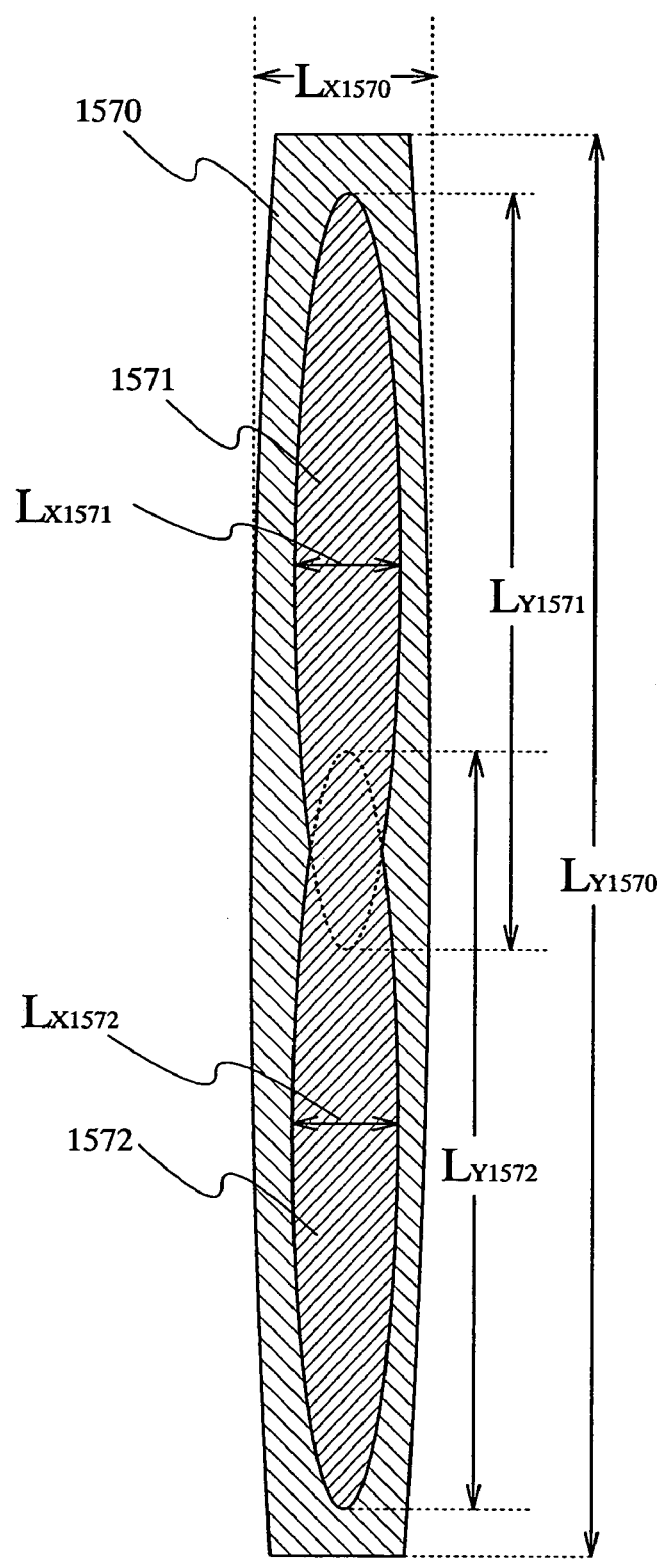
FIG. 7 is a drawing showing the shape of the beam spot utilized in the laser irradiation apparatus shown in FIG. 5.
Figure 8A:
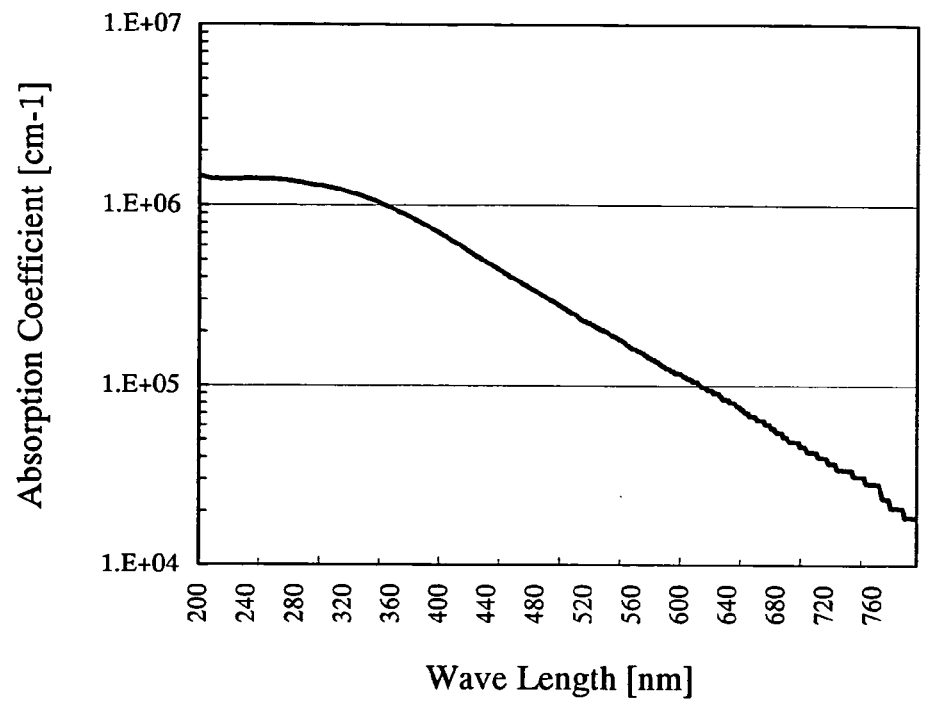
FIGS. 8A and 8B are drawings showing the relation between the laser beam and the absorption coefficient.
Figure 8B:
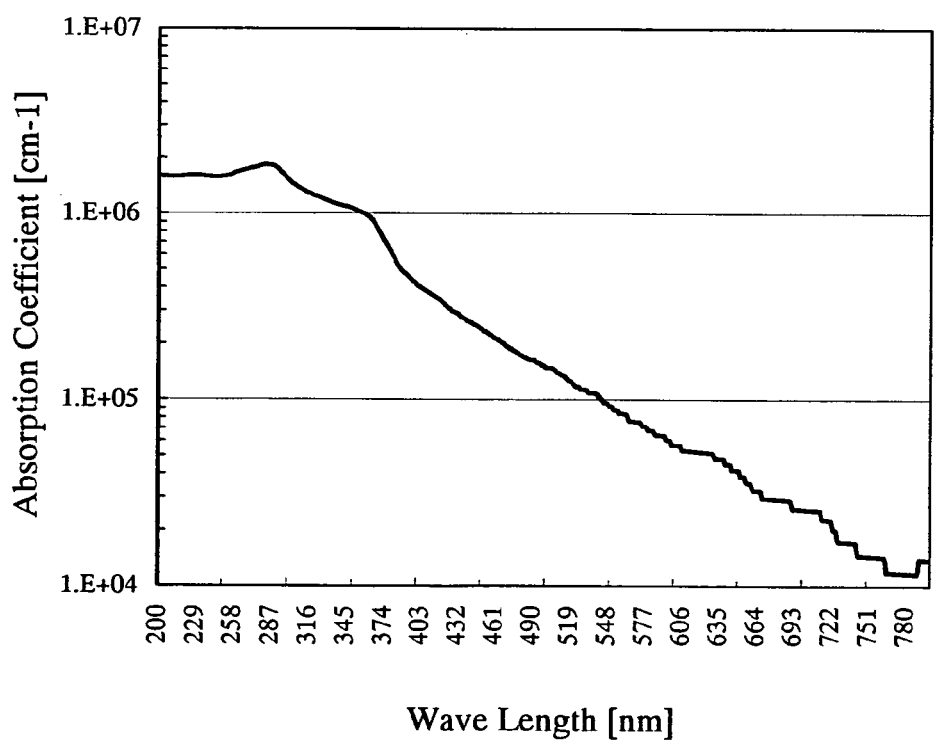

FIG. 7 shows an example of the layout and the shape of each beam spot utilized in the laser irradiation apparatus shown in FIG. 5. In FIG. 7, reference numeral 1570 corresponds to the first beam spot and reference numerals 1571 and 1572 correspond to the second beam spots respectively. In FIG. 7, the beam spots 1571 and 1572 are overlapped partially one another so that the major axis thereof meet. And the first beam spot 1570 is overlapped so as to cover these second beam spots 1571 and 1572 completely.

In this embodiment, the length $L_{X1570}$ of the minor axis of the first beam spot 1570 is set to 400 µm, the length $L_{y1570}$ the major axis is set to 110 mm, and the energy density is set to 25 MW/cm$^2$. When this value is calculated into the energy density per a pulse, 100 mJ/cm$^2$ to 1000 mJ/cm$^2$ is appropriate. In addition, the length $L_{X1571}$ of the minor axis of the second beam spot 1571 is set to 200 µm, the length $L_{y1571}$ of the major axis is set to 60 mm, and the energy density is set to 0.1 MW/cm$^2$. Furthermore, the length $L_{X1572}$ of the minor axis of the second beam spot 1572 is set to 200 µm, the length $L_{y1572}$ of the major axis is set to 60 mm, and the energy density is set to 0.1 MW/cm$^2$. And the second beam spots 1571 and 1572 are overlapped for 20 mm one another so that the length of the overlapped major axes of the second beam spots 1571 and 1572 may become 100 mm.

As described above, by synthesizing a plurality of laser beams to form the second laser beam, the region where the first and the second laser beam is overlapped can be enlarged, and the proportion of region in which the crystallinity is low among the regions where the laser beam is irradiated can be decreased.

Moreover, in this embodiment two laser oscillators are used to irradiate two of the second laser beams to the processing object, but the present invention is not limited to this, and three or more of the second laser beams may be used as the second laser beam. In addition, the first laser beam may also include a plurality of the laser beams.

In the laser irradiation chamber 1513, the processing object 1514 is mounted on the stage 1515 whose position is controlled by the three uniaxial robots 1516, 1517 and 1518. Specifically, the stage 1515 can be rotated in the horizontal plane by the uniaxial robot 1516 for φ axis. In addition, the stage 1515 can be moved in the X axis direction in the horizontal plane by the uniaxial robot 1517 for the X axis. Furthermore, the stage 1515 can be moved in the Y axis direction in the horizontal plane by the uniaxial robot 1518 for the Y axis. The operation of controlling each position is controlled by the central processing device 1519.

The crystal grains extending long to the scanning direction can be formed by scanning the object to be processed to the direction of the X axis as irradiating the linear beam spot extending long in the direction of the Y axis. The scanning speed may be set to 10 mm/s to 2000 mm/s for example, preferably 100 mm/s to 1000 mm/s, but the optimum range of the scanning speed depends on the conditions such as the thickness of the semiconductor film, the material or the like. Thus the single-crystal grains growing to the scanning direction can be formed in a paved state in the region that extends along the scanning direction having a width of 100 mm. The width of the region where the crystal grains growing to the scanning direction are paved is about 100 times broader than that crystallized only by the CW laser beam according to the existing technique.

It is noted that the monitor 1512 with the photo acceptance unit such as CCD may be provided in order to control the exact position of the object to be processed 1514 as shown in this embodiment.

Embodiment 2

Figure 6:
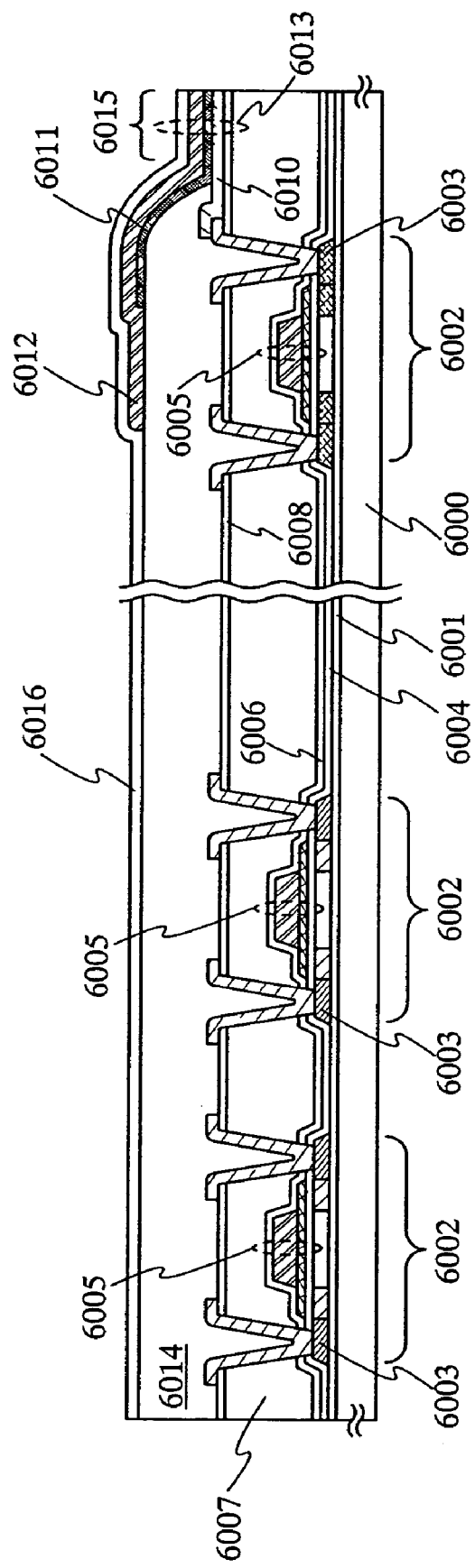
FIG. 6 is a drawing showing the sectional view of the luminous device manufactured with the laser irradiation apparatus in the present invention.

The structure of the pixel in the light emitting device, as one of the semiconductor devices manufactured with the laser irradiation apparatus according to the present invention, is explained with FIG. 6.

In FIG. 6, a base film 6001 is formed on a substrate 6000, and a transistor 6002 is formed on the base film 6001. The transistor 6002 has an active layer 6003, a gate electrode 6005, and a gate insulating film 6004 positioned between the active layer 6003 and the gate electrode 6005.

A poly-crystalline semiconductor film crystallized with the laser irradiation apparatus according to the present invention is employed for the active layer 6003. It is noted that not only silicon but also silicon germanium may be used for the active layer. In case of using silicon germanium, it is preferable that the concentration of germanium is between 0.01 atomic % and 4.5 atomic %. In addition, silicon added carbon nitride may be also used.

Moreover, silicon oxide, silicon nitride, or silicon oxynitride can be used as the gate insulating film 6004. In addition, the film where these are laminated, for example, the film where SiN is laminated on SiO$_2$ may be used as the gate insulating film. Furthermore, an element selected from the group consisting of Ta, W, Ti, Mo, Al, and Cu, or an alloy or chemical compound comprising the element above as its main component can be used as the gate electrode 6005. Moreover, the semiconductor film, typically a poly-crystal silicon film which is added impurities such as phosphorus or the like can be used. And not only the conductive film of a single-layer structure but also the conductive film of a laminated-layer structure comprising a plurality of layers can be used as the gate electrode 6005.

In addition, the transistor 6002 is covered by a first interlayer insulating film 6006 on which a second interlayer insulating film 6007 and a third interlayer insulating film 6008 are laminated in order. The first interlayer insulating film 6006 may be formed in a single-layer structure or a laminated-layer structure of silicon oxide, silicon nitride, or silicon oxynitride with a plasma CVD method or a sputtering method.

As the second interlayer insulating film 6007, an organic resin film, an inorganic insulating film, an insulating film that comprises Si—CH$_x$ crystal and Si—O bond and is made from the material selected from the siloxane group, or the like is used. In this embodiment, non-photosensitive acrylic is used. The film which is hard to transmit the material causing to promote deterioration of the light emitting element such as moisture, oxygen and the like compared to the other insulating films is used as the third interlayer insulating film 6008. Typically it is preferable to use a DLC film, a carbon nitride film, a silicon nitride film formed with an RF sputtering method or the like.

In FIG. 6, reference numeral 6010 denotes an anode, reference numeral 6011 denotes an electroluminescent layer, and reference numeral 6012 denotes a cathode. One of the transistors 6002 is a driver transistor that controls the current supplied to a light emitting element 6013 and thereby it is connected directly or serially through the other circuit elements to the light emitting element 6013. The electroluminescent layer 6011 has a single-layer structure of the luminous layer or a laminated-layer structure of plural layers comprising the luminous layer.

The anode 6010 is formed on the third interlayer insulating film 6008. An organic resin film 6014 is formed as barrier diffusion on the third interlayer insulating film 6008. It is noted that in this embodiment, the organic resin film is used as barrier diffusion, but an inorganic insulating film, an insulating film that comprises Si—CH$_x$ crystal and Si—O bond and is made from the material selected from the siloxane group, or the like may be also used. The organic resin film 6014 has an opening 6015 and the luminous element 6013 is formed by overlapping the anode 6010, the electroluminescent layer 6011 and the cathode 6012 over the opening 6015.

And a passivation film 6016 is formed over the organic resin film 6014 and the cathode 6012. As well as the third interlayer insulating film 6008, the film which is hard to transmit the material causing to promote deterioration of the light emitting element such as moisture and oxygen, for example a DLC film, carbon nitride film, silicon nitride film or the like formed by the RF sputtering method is used as the passivation film 6016.

In addition, it is desirable that the end of the opening 6015 in the organic resin film 6014 are made into a round shape so that the electroluminescent element layer 6011 formed so as to partially overlap on the organic resin film 6014 does not have the end thereof bored. To be more specific, it is desirable that the radius of curvature of the curve line drawn by the sectional surface of the organic resin film 6014 in the opening 6015 is between 0.2 μm and 2 μm. With the above structure, the coverage of the electroluminescent layer and the cathode that are formed later can be enhanced, and thereby it can be prevented that the anode 6010 and the cathode 6012 short out in the opening formed in the electroluminescent layer 6011. Moreover, by easing the interaction of the electroluminescent layer 6011, the defect that the luminous region decreases, what is called shrink, can be reduced and reliability can be thus enhanced.

In addition, FIG. 6 shows an example in which a photosensitive of the positive type acrylic resin is used as the organic resin film 6014. The photosensitive organic resin is classified into the positive type in which the region where the energy line such as beam, electron, ion or the like is exposed is removed, and the negative type in which the region that is exposed is not removed. In the present invention, the organic resin film of the negative type can be also used. Moreover, the organic resin film 6014 may be formed with the photosensitive polyimide. When the organic resin film 6014 is formed of the acrylic of the negative type, the sectional surface of the end of the opening 6015 shapes like a letter of S. Here, it is desirable that the radius of the curvature in the upper end and the lower end are 0.2 μm to 2 μm.

A transparent conductive film can be used as the anode 6010. Not only ITO, but also the transparent conductive film in which indium oxide is mixed with tin oxide (ZnO) for 2% to 20% may be used. In FIG. 6, ITO is used as the anode 6010. The cathode 6012 can be formed of the other known material provided that the work function of the conductive film is low. For example, Ca, Al, CaF, MgAg, AlLi and the like are proper as its material.

It is noted that FIG. 6 indicates the structure in which the beam emitted from the light emitting element is irradiated to the side of substrate 6000. However, the structure in which the beam is irradiated to the opposite side of the substrate may be also used. In addition, in FIG. 6, the transistor 6002 and the anode 6010 of the light emitting element is connected but the present invention is not limited to this structure, and it does not lead to any problems even if the transistor 6002 and the cathode 6001 of the light emitting element is connected. In such a case, the cathode is formed on the third interlayer insulating film 6008 with using TiN or the like.

It is noted that after the state shown in FIG. 6 is obtained, it is preferable to enclose with the passivation film (laminated film, ultraviolet cured resin film or the like) or transparent cover member which is highly airtight and hardly produce gas. The reliability of the OLED is enhanced when the inside of the cover member is satisfied with the inactive atmosphere or the hydroscopic material (barium oxide, for example) is arranged in the cover member.

It is noted that the luminous device is described as an example of the semiconductor devices, but the semiconductor device manufactured by the method according to the present invention is not limited to this.

What is claimed is:

1. A laser irradiation apparatus comprising:
a first laser oscillator generating a first pulsed laser beam having a wavelength of visible light or a shorter wavelength than that of visible light;
means for controlling a shape and a position of a beam spot of the first laser beam;
a plurality of second laser oscillators each generating a second continuous wave laser beam of a solid laser, the second continuous wave laser beam has a fundamental wave;
a plurality of means for controlling a shape and a position of a beam spot of the respective second laser beam to overlap with the beam spot of the first laser beam, each of the plurality of means functioning such that a portion of the beam spot of the first laser beam and an entire portion of the respective beam spots of the second laser beams are overlapped with each other; and
means for controlling a relative position of the beam spot of the first laser beam and the beam spot of the second laser beam to the processing object.

2. A laser irradiation apparatus according to claim 1, wherein the first laser beam has a wavelength of second harmonic.

3. A laser irradiation apparatus according to claim 1, wherein the beam spot of the first laser beam is elliptical, rectangular, or linear.

4. A laser irradiation apparatus according to claim 1, wherein the beam spot of the second laser beam is elliptical, rectangular, or linear.

5. A laser irradiation apparatus according to claim 1, wherein the first laser oscillator is selected from the group consisting of an Ar laser, a Kr laser, an excimer laser, a CO$_2$ laser, a YAG laser, a Y$_2$O$_3$ laser, a YVO$_4$ laser, a YLF laser, a YAlO$_3$ laser, a glass laser, a ruby laser, an alexandrite laser, a Ti: sapphire laser, a copper vapor laser, and a gold vapor laser.

6. A laser irradiation apparatus according to claim 1, wherein the second laser oscillator is selected from the group consisting of a YAG laser, a Y$_2$O$_3$ laser, a YVO$_4$ laser, a YLF laser, a YAlO$_3$ laser, an alexandrite laser, and a Ti: sapphire laser.

7. A laser irradiation apparatus according to claim 1, wherein:
the processing object comprises a substrate having a thickness of "d" which is transparent to the first laser beam; and
an incident angle "φ1" of the first laser beam to a surface of the processing object satisfies an inequality of φ1≧arctan (W1/2d) when W1 is defined as a length of a major axis or a minor axis of the beam spot of the first laser beam.

8. A laser irradiation apparatus according to claim 1, wherein:

the processing object comprises a substrate having a thickness of "d" which is transparent to the second laser beam; and an incident angle "$\phi 2$" of the second laser beam to a surface of the processing object satisfies an inequality of $\phi 2 \geq \arctan (W2/2d)$ when W2 is defined as a length of a major axis or a minor axis of the beam spot of the second laser beam.

9. A laser irradiation apparatus comprising:

a first laser oscillator generating a first pulsed laser beam having a wavelength of visible light or a shorter wavelength than that of visible light;

means for controlling a shape and a position of a beam spot of the first laser beam;

a second laser oscillator generating a second continuous wave laser beam of a solid laser, the second continuous wave laser beam has a fundamental wave;

means for controlling a shape and a position of a beam spot of the second laser beam to overlap with the beam spot of the first laser beam, the means functioning such that the beam spot of the first laser beam is larger than that of the second laser beam; and means for controlling a relative position of the beam spot of the first laser beam and the beam spot of the second laser beam to a processing object.

10. A laser irradiation apparatus according to claim 9, wherein the first laser beam has a wavelength of second harmonic.

11. A laser irradiation apparatus according to claim 9, wherein the beam spot of the first laser beam is elliptical, rectangular, or linear.

12. A laser irradiation apparatus according to claim 9, wherein the beam spot of the second laser beam is elliptical, rectangular, or linear.

13. A laser irradiation apparatus according to claim 9, wherein the first laser oscillator is selected from the group consisting of an Ar laser, a Kr laser, an excimer laser, a $CO_2$ laser, a YAG laser, a $Y_2O_3$ laser, a $YVO_4$ laser, a YLF laser, a $YAlO_3$ laser, a glass laser, a ruby laser, an alexandrite laser, a Ti: sapphire laser, a copper vapor laser, and a gold vapor laser.

14. A laser irradiation apparatus according to claim 9, wherein the second laser oscillator is selected from the group consisting of a YAG laser, a $Y_2O_3$ laser, a $YVO_4$ laser, a YLF laser, a $YAlO_3$ laser, an alexandrite laser, and a Ti: sapphire laser.

15. A laser irradiation apparatus according to claim 9, wherein:

the processing object comprises a substrate having a thickness of "d" which is transparent to the first laser beam; and an incident angle "$\phi 1$" of the first laser beam to a surface of the processing object satisfies an inequality of $\phi 1 \geq \arctan (W1/2d)$ when W1 is defined as a length of a major axis or a minor axis of the beam spot of the first laser beam.

16. A laser irradiation apparatus according to claim 9, wherein:

the processing object comprises a substrate having a thickness of "d" which is transparent to the second laser beam; and an incident angle "$\phi 2$" of the second laser beam to a surface of the processing object satisfies an inequality of $\phi 2 \geq \arctan (W2/2d)$ when W2 is defined as a length of a major axis or a minor axis of the beam spot of the second laser beam.

17. A laser irradiation method comprising the step of:

irradiating a processing object with a first pulsed laser beam having a wavelength of visible light or a shorter wavelength than that of visible light and a plurality of second continuous wave laser beams of solid lasers, each of the plurality of second continuous wave laser beams has a fundamental wave, wherein when the processing object is irradiated with the first laser beam and the plurality of second laser beams, a portion of a first beam spot formed on a surface of the processing object by the first laser beam and an entire portion of a plurality of second beam spots formed on the surface of the processing object by the plurality of second laser beams are overlapped with each other.

18. A laser irradiation method according to claim 17, wherein the first laser beam has a wavelength of second harmonic.

19. A laser irradiation method according to claim 17, wherein the first beam spot formed on the surface of the processing object by the first laser beam is elliptical, rectangular, or linear.

20. A laser irradiation method according to claim 17, wherein the second beam spot formed on the surface of the processing object by the second laser beam is elliptical, rectangular, or linear.

21. A laser irradiation method according to claim 17, wherein the first laser beam is emitted from a laser oscillator selected from the group consisting of an Ar laser, a Kr laser, an excimer laser, a $CO_2$ laser, a YAG laser, a $Y_2O_3$ laser, a $YVO_4$ laser, a YLF laser, a $YAlO_3$ laser, a glass laser, a ruby laser, an alexandrite laser, a Ti: sapphire laser, a copper vapor laser, and a gold vapor laser.

22. A laser irradiation method according to claim 17, wherein the second laser beam is emitted from a laser oscillator selected from the group consisting of a YAG laser, a $Y_2O_3$ laser, a $YVO_4$ laser, a YLF laser, a $YAlO_3$ laser, an alexandrite laser, and a Ti: sapphire laser.

23. A laser irradiation method according to claim 17, wherein:

the processing object comprises a substrate having a thickness of "d" which is transparent to the first laser beam; and an incident angle "$\phi 1$" of the first laser beam to the surface of the processing object satisfies an inequality of $\phi 1 \geq \arctan (W1/2d)$ when W1 is defined as a length of a major axis or a minor axis of the first beam spot formed on the surface of the processing object by the first laser beam.

24. A laser irradiation method according to claim 17, wherein:

the processing object comprises a substrate having a thickness of "d" which is transparent to the second laser beam; and an incident angle "$\phi 2$" of the second laser beam to the surface of the processing object satisfies an inequality of $\phi 2 \geq \arctan (W2/2d)$ when W2 is defined as a length of a major axis or a minor axis of the second beam spot formed on the surface of the processing object by the second laser beam.

25. A laser irradiation method comprising the step of:

irradiating a processing object with a first pulsed laser beam having a wavelength of visible light or a shorter wavelength than that of visible light and a second continuous wave laser beam of a solid laser, the second continuous wave laser beam has a fundamental wave, wherein when the first laser beam and the second laser beam are irradiated, a beam spot formed on a surface of the processing object by the first laser beam and a beam spot formed on the surface of the processing object by the second laser beam are overlapped, and wherein the beam spot of the first laser beam is larger than that of the second laser beam.

26. A laser irradiation method according to claim 25, wherein the first laser beam has a wavelength of second harmonic.

27. A laser irradiation method according to claim 25, wherein the beam spot formed on the surface of the processing object by the first laser beam is elliptical, rectangular, or linear.

28. A laser irradiation method according to claim 25, wherein the beam spot formed on the surface of the processing object by the second laser beam is elliptical, rectangular, or linear.

29. A laser irradiation method according to claim 25, wherein the first laser beam is emitted from a laser oscillator selected from the group consisting of an Ar laser, a Kr laser, an excimer laser, a $CO_2$ laser, a YAG laser, a $Y_2O_3$ laser, a $YVO_4$ laser, a YLF laser, a $YAlO_3$ laser, a glass laser, a ruby laser, an alexandrite laser, a Ti: sapphire laser, a copper vapor laser, and a gold vapor laser.

30. A laser irradiation method according to claim 25, wherein the second laser beam is emitted from a laser oscillator selected from the group consisting of a YAG laser, a $Y_2O_3$ laser, a $YVO_4$ laser, a YLF laser, a $YAlO_3$ laser, an alexandrite laser, and a Ti: sapphire laser.

31. A laser irradiation method according to claim 25, wherein:
the processing object comprises a substrate having a thickness of "d" which is transparent to the first laser beam; and
an incident angle "$\phi 1$" of the first laser beam to the surface of the processing object satisfies an inequality of $1 \geq \arctan(W1/2d)$ when W1 is defined as a length of a major axis or a minor axis of the beam spot formed on the surface of the processing object by the first laser beam.

32. A laser irradiation method according to claim 25, wherein:
the processing object comprises a substrate having a thickness of "d" which is transparent to the second laser beam; and
an incident angle "2" of the second laser beam to the surface of the processing object satisfies an inequality of $2 \geq \arctan(W2/2d)$ when W2 is defined as a length of a major axis or a minor axis of the beam spot formed on the surface of the processing object by the second laser beam.

33. A method for manufacturing a semiconductor device comprising the steps of:
forming a semiconductor film on an insulating surface; and
irradiating the semiconductor film with a first pulsed laser beam having a wavelength of visible light or a shorter wavelength than that of visible light and a plurality of second continuous wave laser beams of solid lasers, each of the plurality of second continuous wave laser beams has a fundamental wave to crystallize the semiconductor film,
wherein when the semiconductor film is irradiated with the first laser beam and the plurality of second laser beams, a portion of a first beam spot formed on a surface of the semiconductor film by the first laser beam and an entire portion of a plurality of second beam spots formed on the surface of the semiconductor film by the plurality of second laser beams are overlapped with each other.

34. A method for manufacturing a semiconductor device according to claim 33, wherein the first laser beam has a wavelength of second harmonic.

35. A method for manufacturing a semiconductor device according to claim 33, wherein the first beam spot formed on the surface of the semiconductor film by the first laser beam is elliptical, rectangular, or linear.

36. A method for manufacturing a semiconductor device according to claim 33, wherein the second beam spot formed on the surface of the semiconductor film by the second laser beam is elliptical, rectangular or linear.

37. A method for manufacturing a semiconductor device according to claim 33, wherein the first laser beam is emitted from a laser oscillator selected from the group consisting of an Ar laser, a Kr laser, an excimer laser, a $CO_2$ laser, a YAG laser, a $Y_2O_3$ laser, a $YVO_4$ laser, a YLF laser, a $YAlO_3$ laser, a glass laser, a ruby laser, an alexandrite laser, a Ti: sapphire laser, a copper vapor laser, and a gold vapor laser.

38. A method for manufacturing a semiconductor device according to claim 33, wherein the second laser beam is emitted from a laser oscillator selected from the group consisting of a YAG laser, a $Y_2O_3$ laser, a $YVO_4$ laser, a YLF laser, a $YAlO_3$ laser, an alexandrite laser, and a Ti: sapphire laser.

39. A method for manufacturing a semiconductor device according to claim 33, wherein:
the semiconductor film is formed over a substrate comprising the insulating surface and having a thickness of "d" which is transparent to the first laser beam; and
an incident angle "$\phi 1$" of the first laser beam to the surface of the semiconductor film satisfies an inequality of $\phi 1 \geq \arctan(W1/2d)$ when W1 is defined as a length of a major axis or a minor axis of the first beam spot formed on the surface of the semiconductor film by the first laser beam.

40. A method for manufacturing a semiconductor device according to claim 33, wherein:
the semiconductor film is formed over a substrate comprising the insulating surface and having a thickness of "d" which is transparent to the second laser beam; and
an incident angle "$\phi 2$" of the second laser beam to the surface of the semiconductor film satisfies an inequality of $\phi 2 \geq \arctan(W2/2d)$ when W2 is defined as a length of a major axis or a minor axis of the second beam spot formed on the surface of the semiconductor film by the second laser beam.

41. A method for manufacturing a semiconductor device comprising the steps of:
forming a semiconductor film on an insulating surface; and
irradiating the semiconductor film with a first pulsed laser beam having a wavelength of visible light or a shorter wavelength than that of visible light and a second continuous wave laser beam of a solid laser, the second continuous wave laser beam has a fundamental wave to crystallize the semiconductor film, wherein when the first laser beam and the second laser beam are irradiated, a beam spot formed on a surface of the semiconductor film by the first laser beam and a beam spot formed on the surface of the semiconductor film by the second laser beam are overlapped, and wherein the beam spot of the first laser beam is larger than that of the second laser beam.

42. A method for manufacturing a semiconductor device according to claim 41, wherein the first laser beam has a wavelength of second harmonic.

43. A method for manufacturing a semiconductor device according to claim 41, wherein the beam spot formed on the surface of the semiconductor film by the first laser beam is elliptical, rectangular, or linear.

44. A method for manufacturing a semiconductor device according to claim 41, wherein the beam spot formed on the surface of the semiconductor film by the second laser beam is elliptical, rectangular or linear.

45. A method for manufacturing a semiconductor device according to claim 41, wherein the first laser beam is emitted from a laser oscillator selected from the group consisting of an Ar laser, a Kr laser, an excimer laser, a $CO_2$ laser, a YAG laser, a $Y_2O_3$ laser, a $YVO_4$ laser, a YLF laser, a $YAlO_3$ laser, a glass laser, a ruby laser, an alexandrite laser, a Ti: sapphire laser, a copper vapor laser, and a gold vapor laser.

46. A method for manufacturing a semiconductor device according to claim 41, wherein the second laser beam is emitted from a laser oscillator selected from the group consisting of a YAG laser, a $Y_2O_3$ laser, a $YVO_4$ laser, a YLF laser, a $YAlO_3$ laser, an alexandrite laser, and a Ti: sapphire laser.

47. A method for manufacturing a semiconductor device according to claim 41, wherein:

the semiconductor film is formed over a substrate comprising the insulating surface and having a thickness of "d" which is transparent to the first laser beam; and an incident angle "$\phi1$" of the first laser beam to the surface of the semiconductor film satisfies an inequality of $\phi1 \geq \arctan(W1/2d)$ when W1 is defined as a length of a major axis or a minor axis of the beam spot formed on the surface of the semiconductor film by the first laser beam.

48. A method for manufacturing a semiconductor device according to claim 41, wherein:

the semiconductor film is formed over a substrate comprising the insulating surface and having a thickness of "d" which is transparent to the second laser beam; and an incident angle "$\phi2$" of the second laser beam to the surface of the semiconductor film satisfies an inequality of $\phi2 \geq \arctan(W2/2d)$ when W2 is defined as a length of a major axis or a minor axis of the beam spot formed on the surface of the semiconductor film by the second laser beam.

* * * * *

UNITED STATES PATENT AND TRADEMARK OFFICE
CERTIFICATE OF CORRECTION

PATENT NO.         : 7,919,726 B2
APPLICATION NO.    : 10/721075
DATED              : April 5, 2011
INVENTOR(S)        : Koichiro Tanaka It is certified that error appears in the above-identified patent and that said Letters Patent is hereby corrected as shown below:

At column 7, line 42, "fist" should be --first--;

At column 21, line 40, "$1 \geqq \arctan(W1/2d)$" should be --$\Phi 1 \geqq \arctan(W1/2d)$--;

At column 21, line 49, "2" should be --$\Phi 2$--;

At column 21, line 51, "$2 \geqq \arctan(W1/2d)$" should be --$\Phi 2 \geqq \arctan(W1/2d)$--.

Signed and Sealed this
Twenty-fifth Day of October, 2011

David J. Kappos
*Director of the United States Patent and Trademark Office*